United States Patent
Wang et al.

(10) Patent No.: US 12,158,535 B2
(45) Date of Patent: Dec. 3, 2024

(54) POSITIONING METHOD AND COMMUNICATION DEVICE

(71) Applicant: VIVO MOBILE COMMUNICATION CO., LTD., Guangdong (CN)

(72) Inventors: Yuanyuan Wang, Guangdong (CN); Huaming Wu, Guangdong (CN); Ye Si, Guangdong (CN); Zixun Zhuang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 208 days.

(21) Appl. No.: 17/858,275

(22) Filed: Jul. 6, 2022

(65) Prior Publication Data
US 2022/0334213 A1    Oct. 20, 2022

Related U.S. Application Data

(63) Continuation of application No. PCT/CN2021/071310, filed on Jan. 12, 2021.

(30) Foreign Application Priority Data

Jan. 14, 2020  (CN) .......................... 202010039189.0

(51) Int. Cl.
*G01S 5/02*     (2010.01)
*G01S 5/00*     (2006.01)
*H04W 64/00*    (2009.01)

(52) U.S. Cl.
CPC .......... *G01S 5/0218* (2020.05); *G01S 5/0036* (2013.01); *G01S 5/011* (2020.05); *G01S 5/0244* (2020.05); *H04W 64/006* (2013.01)

(58) Field of Classification Search
CPC ...... G01S 5/0218; G01S 5/011; G01S 5/0244; G01S 5/0036
(Continued)

(56) References Cited

U.S. PATENT DOCUMENTS

2017/0325057 A1    11/2017  Zhang et al.
2019/0200339 A1     6/2019  Handte et al.
(Continued)

FOREIGN PATENT DOCUMENTS

CN    109792278 A      5/2019
CN    109844558 A  *   6/2019  ............. G01S 1/042
(Continued)

OTHER PUBLICATIONS

Fraunhofer Iis, "NR beam management supporting multi-gNB measurements for positioning", 3GPP TSG RAN WG1 Meeting #95, R1-1813583, Spokane, US, Nov. 12-16, 2018.
(Continued)

*Primary Examiner* — Harry K Liu
(74) *Attorney, Agent, or Firm* — Price Heneveld LLP (57) ABSTRACT

A positioning method and a communication device are provided, which relate to the field of communication technologies. The method includes: determining first information. The first information includes at least one of the following: direction information of a target beam, energy change information of the target beam, LOS path indication information, and beam identification information. The first information is used to determine positioning information of the first device. The LOS path indication information is used to indicate whether the target beam is an LOS path. The beam identification information is identification information of the target beam.

20 Claims, 3 Drawing Sheets

(58) Field of Classification Search
USPC .......................................................... 342/451
See application file for complete search history.

(56) References Cited

U.S. PATENT DOCUMENTS

| | | |
|---|---|---|
| 2019/0320408 A1 | 10/2019 | Opshaug et al. |
| 2019/0361111 A1 | 11/2019 | Sadiq et al. |
| 2019/0380056 A1 | 12/2019 | Lee et al. |

FOREIGN PATENT DOCUMENTS

| | | |
|---|---|---|
| WO | 2016115711 A1 | 7/2016 |
| WO | 2019199935 A1 | 10/2019 |

OTHER PUBLICATIONS

Intel Corporation, Analysis of Techniques for NR DL Positioning, 3GPP TSG RAN WG1 Ad-Hoc Meeting 1901, R1-1900512, Jan. 21-25, 2019, Taipei, Taiwan.
Intel Corporation, Analysis of Techniques for NR UL Positioning, 3GPP TSG RAN WG1 Ad-Hoc Meeting 1901, R1-1900513, Jan. 21-25, 2019, Taipei, Taiwan.

\* cited by examiner

POSITIONING METHOD AND COMMUNICATION DEVICE

CROSS-REFERENCE TO RELATED APPLICATIONS

This application is continuation application of PCT International Application No. PCT/CN2021/071310 filed on Jan. 12, 2021, which claims priority to Chinese Patent Application No. 202010039189.0, filed in China on Jan. 14, 2020, which are incorporated herein by reference in their entireties.

TECHNICAL FIELD

Embodiments of the present invention relate to the field of communications technologies, and in particular, to a positioning method and a communication device.

BACKGROUND

In uplink positioning protocols of communications systems, positioning technologies related to NR and LTE systems mainly implement positioning by measuring related positioning reference signals. The NR system is used as an example. In a related positioning solution, uplink positioning is used as an example, a terminal device may transmit a positioning reference signal based on a beam configured by a network-side device, and then the network-side device may determine a location of the terminal device based on measurement information (for example, a time of arrival) for measuring the positioning reference signal.

In this way, in the case that the network-side device does not know the location of the terminal device and a location of an adjacent cell, if a beam through which the terminal device transmits the positioning reference signal is an NLOS path, the network-side device cannot determine whether the beam is an NLOS path, and consequently cannot accurately position the location of the terminal device.

SUMMARY

According to a first aspect, an embodiment of the present invention provides a positioning method, applied to a first device. The method includes: determining first information, where the first information includes at least one of the following: direction information of a target beam, energy change information of the target beam, LOS path indication information, and beam identification information. The first information is used to determine positioning information of the first device. The LOS path indication information is used to indicate whether the target beam is an LOS path. The beam identification information is identification information of the target beam.

According to a second aspect, an embodiment of the present invention provides a positioning method, applied to a second device. The method includes: obtaining first information from a first device; and determining positioning information of the first device based on the first information, where the first information includes at least one of the following: direction information of a target beam, energy change information of the target beam, LOS path indication information, and beam identification information. The LOS path indication information is used to indicate whether the target beam is an LOS path. The beam identification information is identification information of the target beam.

According to a third aspect, an embodiment of the present invention provides a communication device. The communication device is a first device, and the first device includes:
a determining module, configured to determine first information, where the first information includes at least one of the following: direction information of a target beam, energy change information of the target beam, LOS path indication information, and beam identification information; the first information is used to determine positioning information of the first device; the LOS path indication information is used to indicate whether the target beam is an LOS path; and the beam identification information is identification information of the target beam.

According to a fourth aspect, an embodiment of the present invention provides a communication device. The communication device is a second device, and the second device includes:
an obtaining module, configured to obtain first information from a first device; and a determining module, configured to determine positioning information of the first device based on the first information obtained by the obtaining module, where the first information includes at least one of the following: direction information of a target beam, energy change information of the target beam, LOS path indication information, and beam identification information; the LOS path indication information is used to indicate whether the target beam is an LOS path; and the beam identification information is identification information of the target beam.

According to a fifth aspect, an embodiment of the present invention provides a communication device. The communication device is a first device, and the first device includes a processor, a memory, and a computer program stored in the memory and capable of running on the processor. When the computer program is executed by the processor, the steps of the positioning method according to the first aspect are implemented.

According to a sixth aspect, an embodiment of the present invention provides a communication device. The communication device is a second device, and the second device includes a processor, a memory, and a computer program stored in the memory and capable of running on the processor. When the computer program is executed by the processor, the steps of the positioning method according to the second aspect are implemented.

According to a seventh aspect, an embodiment of the present invention provides a computer-readable storage medium, where the computer-readable storage medium stores a computer program. When the computer program is executed by a processor, the steps of the positioning method described above are implemented.

DETAILED DESCRIPTION OF THE EMBODIMENTS

The following clearly describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of this application.

Some of the terms described in the embodiments of the present invention are explained below to facilitate understanding by readers.

1. Line of Sight (LOS)

At present, propagation conditions of wireless communications systems are classified into LOS and non-NLOS environments. Under a line-of-sight condition, a wireless signal is transmitted in a straight line between a transmit end and a receive end without being obstructed. This requires that there be no object that obstructs radio waves in a first Fresnel zone. If this condition is not met, signal strength drops significantly. A size of the Fresnel zone depends on frequencies of the radio waves and a distance between a transmitter and a receiver.

In NR positioning, times of arrival or angles of arrival of received and measured signals and whether a path is a line-of-sight path affect final positioning accuracy. A positioning solution provided in embodiments of the present invention can determine whether a target beam is an LOS path or anon-LOS path.

2. Relevant Positioning Methods

Most of SRS information configured by using LTE RRC for UE is basic information (refer to 36.331 SoundingRS-UL-Config, including bandwidth, frequency hopping, cyclic shift, and the like), and there is no reference power or QCL configuration in an SRS power configuration.

In R15, a sounding signal does not support a positioning function, and there is no positioning-related configuration. A configuration of the signal mainly serves the following use cases: beam management, codebook, nonCodebook and antenna switching. For a configuration for channel detection, only a serving cell is considered.

In R16, for a QCL reference signal and a path loss reference signal of an SRS signal transmitted by UE, configuration is performed for a serving cell and a neighboring cell, and it is assumed that the SRS configuration is performed by using RRC. However, because the serving cell does not know locations of the neighboring cell and the UE, configured QCL may not be appropriate. When the SRS configuration is not appropriate, the UE transmits a signal based on a configured reference, or changes a transmission direction, which is not known to the serving cell, the neighboring cell, or an LMF, and the configuration cannot be updated to a valid configuration. In addition, there is no effective solution when measurement of the configured QCL and reference fails.

According to positioning solutions provided in the embodiments of the present invention, first information reported by a first device to a second device includes at least one of the following information of a target beam: direction information, energy change information, LOS path indication information, and beam identification information, so that the second device can accurately position a specific location of the target beam, and further can obtain positioning information of the first device with higher accuracy, thereby improving communication efficiency and effectiveness.

The positioning solutions provided in the embodiments of the present invention may be applied to reporting of an actual angle of an SRS transmit beam of the UE for uplink positioning; or may be applied to reporting of a PRS measurement angle of the UE for downlink positioning; or may be applied to reporting of an adjacent beam energy change of an RSTD, or a time of arrival (TOA), or an angle of arrival (AOA), or an angle of departure (AOD).

3. Other Terms

It should be noted that "l" in this specification indicates that an "or" relationship. For example, A/B may represent A or B. "and/or" in this specification is merely an association relationship for describing associated objects, and represents that three relationships may exist. For example, A and/or B may represent the following three cases: Only A exists, both A and B exist, and only B exists.

It should be noted that, in order to clearly describe the technical solutions of the embodiments of this application, in the embodiments of this application, words such as "first" and "second" are used to distinguish between same or similar items that have basically a same function or effect. A person skilled in the art may understand that the words such as "first" and "second" do not limit a quantity and an execution order. For example, the first device and the second device are used to distinguish between different devices, instead of describing a specific order of the devices.

It should be noted that, in the embodiments of the present invention, words such as "an example" or "for example" are used to provide an example, an illustration, or a description. Any embodiment or design solution described as "an example" or "for example" in the embodiments of the present invention shall not be interpreted to be more preferential or advantageous than other embodiments or design solutions. Specifically, the terms such as "an example" or "for example" are intended to present related concepts in a specific manner.

It should be noted that, in the embodiments of this application, "of", "relevant", and "corresponding" may sometimes be interchanged. It should be noted that their intended meanings are the same unless their differences are emphasized. In the embodiments of this application, "a plurality of" means two or more.

With reference to relevant accompanying drawings, the following describes positioning methods provided in embodiments of the present invention.

The technical solutions provided in the present invention may be applied to various communications systems, for example, a 5G communications system, a future evolved system, or a multi-communication fusion system. A plurality of application scenarios may be included, such as machine to machine (M2M), D2M, macro-micro communications, enhanced mobile broadband (eMBB), ultra reliable and low latency communications (uRLLC), and massive machine type communications (mMTC). These scenarios include, but are not limited to, scenarios such as communication between terminal devices, communication between network-side devices, or communication between a network-side device and a terminal device. The embodiments of the present invention can be applied to communication between a network-side device and a terminal device, or communication between terminal devices, or communication between network-side devices in a 5G communications system.

Figure 1:
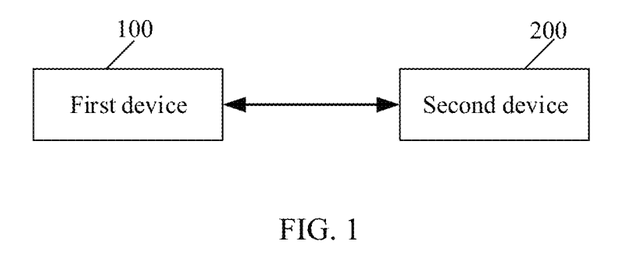
FIG. 1 is a possible schematic structural diagram of a communications system according to an embodiment of the present invention.

FIG. 1 is a possible schematic structural diagram of a communications system used in an embodiment of the present invention. As shown in FIG. 1, the communications system includes a first device 100 and a second device 200. Only one first device 100 and one second device 200 are shown in FIG. 1.

For example, the first device 100 may be a terminal device or a network-side device, and the second device 200 may be a receiving device or a server. For example, the first device 100 is a terminal device, and the second device 200 may be a network-side device; or the first device 100 is a terminal device, and the second device 200 may be a server; or the first device 100 is a network-side device, and the second device 200 may be a server.

The network-side device may be a base station, a core network device, a transmission and reception point (TRP), a relay station, an access point, or the like. The network-side device may be a base transceiver station (BTS) in a global system for mobile communications (GSM) or code division multiple access (CDMA) network, or may be an NB (NodeB) in wideband code division multiple access (WCDMA), or may be an eNB or eNodeB (evolved NodeB) in LTE. The network-side device may alternatively be a wireless controller in a cloud radio access network (CRAN) scenario. The network-side device may also be a network-side device in a 5G communications system or a network-side device in a future evolved network. However, the use of words does not constitute a limitation on the present invention.

The terminal device may be a wireless terminal device or a wired terminal device. The wireless terminal device may be a device providing a user with voice and/or other service data connectivity, a handheld device or a computing device having a wireless communication function, or another processing device connected to a wireless modem, a vehicle-mounted device, a wearable device, a terminal device in a future 5G network, a terminal device in a future evolved PLMN network, or the like. The wireless terminal device may communicate with one or more core networks through a radio access network (RAN). The wireless terminal device may be a mobile terminal device such as a mobile phone (or referred to as a "cellular" phone) or a computer having a mobile terminal device, for example, may be a portable, pocket-sized, hand-held, computer-built or vehicle-mounted mobile apparatus, which exchanges a language and/or data with the radio access network, or may be a device such as a personal communication service (PCS) phone, a cordless phone, a Session Initiation Protocol (SIP) phone, a wireless local loop (WLL) station, or a personal digital assistant (PDA). The wireless terminal device may alternatively be a mobile device, user equipment (UE), a UE terminal device, an access terminal device, a wireless communication device, a terminal device unit, a terminal device station, a mobile station, a mobile console (Mobile), a remote station, a remote terminal device (Remote Terminal), a subscriber unit, a subscriber station, a user agent, a terminal device apparatus, or the like. For example, in this embodiment of the present invention, FIG. 1 shows a mobile phone as an example of a terminal device.

The foregoing server may be a single server, a server cluster including a plurality of servers, or a cloud computing service center. For example, the foregoing server may be referred to as a positioning server. The positioning server may be: a location server (LoCation Services, LCS), or a location management function (LMF) server, or an enhanced serving mobile location center (ESMLC).

Figure 2:
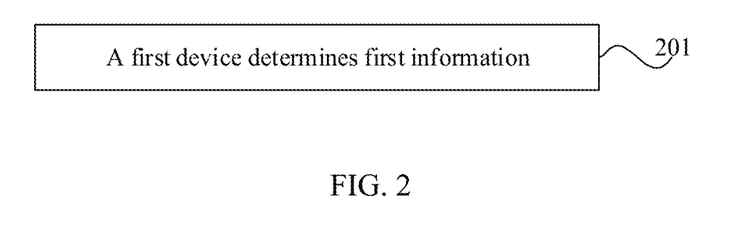
FIG. 2 is a schematic flowchart 1 of a positioning method according to an embodiment of the present invention.

With reference to the foregoing content, FIG. 2 shows a schematic flowchart of a positioning method according to an embodiment of the present invention. As shown in FIG. 2, the positioning method may include the following step 201:

Step 201: A first device determines first information.

In this embodiment of the present invention, the first information is used to determine positioning information of the first device.

In this embodiment of the present invention, the first information includes at least one of the following: direction information of a target beam, energy change information of the target beam, LOS path indication information, and beam identification information. The LOS path indication information is used to indicate whether the target beam is an LOS path. The beam identification information is identification information of the target beam.

Optionally, in this embodiment of the present invention, in the case that the first device is a terminal device, the first information includes at least one of the following: direction information of a target beam, energy change information of the target beam, LOS path indication information, and beam identification information. In the case that the first device is a network-side device, the first information includes at least one of the following: energy change information of a target beam and LOS path indication information.

Optionally, in this embodiment of the present invention, the first information is transmitted in location information or in a measurement result of a target signal.

For example, the location information may be location information of the first device.

For example, in the case that the first device is a network-side device and the network-side device reports location information of a terminal device to a server, the location information may be location information of the terminal device.

Optionally, in this embodiment of the present invention, the target beam may be a measurement beam corresponding to a measurement result, reported by the first device, of the target signal. That is, the target beam may be a receive beam used for receiving the target signal when the first device serves as a receive end. The measurement result is a measurement result obtained by the first device after measuring the target signal through the target beam, and the target signal is a downlink signal and includes at least one of the following: a downlink positioning reference signal (DL-Positioning Reference Signal, DL-PRS), a synchronization signal/PBCH block (SSB), a channel state information reference signal (CSI-RS), and a tracking reference signal (TRS).

Optionally, in this embodiment of the present invention, the target beam is a corresponding beam through which the first device transmits the target signal. That is, the target beam may be a transmit beam used for sending the target signal when the first device serves as a transmit end. The target signal is an uplink reference signal, and includes at least one of the following: a sounding reference signal (SRS) and a demodulation reference signal (DMRS).

Optionally, in the case that the target beam is a receive beam, the target beam may be a beam corresponding to reporting information configured by a network side or a beam corresponding to a measurement result reported by the UE.

Optionally, in this embodiment of the present invention, in the case that the target beam is a transmit beam, the transmit beam may be all or some beams currently transmitted by the terminal device. It should be noted that the some transmitted beams may be beams selected by the terminal device or configured by the network-side device, which is not limited in this embodiment of the present invention.

Optionally, in this embodiment of the present invention, the first device may report the beam identification information. It should be noted that the beam identification information may be used in combination with at least one of the direction information of the target beam, the energy change information of the target beam, and the LOS path indication information, or can be used alone, which is not limited in this embodiment of the present invention.

Optionally, in this embodiment of the present invention, the beam identification information may be a transmit beam ID. Further, the transmit beam ID may be preconfigured (that is, different IDs are configured for different beams or different beam directions), pre-agreed, or implicitly configured, and may be used to indicate a limited beam direction. It should be noted that the transmit beam ID can be used together with posture information of the terminal device.

Optionally, the beam identification information may alternatively be indication information of the uplink reference signal or the downlink reference signal.

Optionally, in this embodiment of the present invention, in the case that the target beam is a receive beam, the receive beam may be all or some beams currently received by the terminal device. It should be noted that the some received beams may be beams selected by the terminal device or configured by the network-side device, which is not limited in this embodiment of the present invention.

Optionally, in this embodiment of the present invention, the beam identification information may be a target beam ID. Further, there is a correspondence between the target beam ID and direction information of the target beam. That is, different beam IDs correspond to different beam directions. It can be understood that the target beam ID is used to indicate the direction information of the target beam.

Optionally, in this embodiment of the present invention, the beam identification information may be a receive beam ID. Further, the receive beam ID may be configured (that is, different beam IDs are configured for different beams, and beam directions of different beams are different), pre-agreed, or implicitly configured, and may be used to indicate a limited beam direction. It should be noted that the receive beam ID can be used together with the posture information of the terminal device.

Further, if information about a receive beam obtained for two consecutive times remains unchanged, direction information of the receive beam may be indicated only by beam identification information.

Further, the beam identification information may indicate only an LOS path receive beam or an NLOS path receive beam.

Optionally, in this embodiment of the present invention, the first information further includes measurement information of the target signal. The measurement information of the target signal includes at least one of the following: time information of a round-trip time (RTT), time information of a TOA, time information of a time difference of arrival (TDOA), information about a reference signal time difference (RSTD), and information about reference signal received power (RSRP). For example, the time information of the TOA may be a time of arrival of the target signal measured by the first device through the target beam, and the time information of the TDOA may be information about a time difference of arrival between the target signal measured through the target beam and the reference signal.

Optionally, in this embodiment of the present invention, in the case that the target beam is a receive beam, when the first device reports direction information and/or receive beam IDs of all or some receive beams, only the receive beam ID needs to be reported in a corresponding signal measurement result. The receive beam ID is used to indicate receiving direction information of the receive beam, and a correspondence between the receiving direction information and the receive beam ID may be preconfigured or pre-agreed.

Optionally, in this embodiment of the present invention, in the case that the target beam is a transmit beam, when the first device reports direction information and/or transmit beam IDs of all or some transmit beams, only the transmit beam ID needs to be reported in a corresponding signal measurement result. The transmit beam ID is used to indicate transmitting direction information of the transmit beam, and a correspondence between the transmitting direction information and the transmit beam ID may be preconfigured or pre-agreed.

Optionally, in this embodiment of the present invention, the direction information of the target beam is used to indicate at least one of the following information of the target beam of the first device: an azimuth angle, an elevation angle, and a beam width.

For example, the azimuth angle may be considered as an angle of the target beam. After obtaining the angle of the target beam, the first device converts the angle of the target beam into an angle relative to the geographic north, that is, the azimuth angle is an included angle of the target beam relative to the geographic north, and further, a counterclockwise direction may be set as positive, where the geographic north is determined by a compass of the first device; and/or the azimuth angle is direction information of an angle of the target beam relative to a reference beam, further, the reference beam may be selected by the terminal device or configured by the network side; and/or the elevation angle is an included angle of the target beam relative to a vertical direction. For example, the elevation angle is 0 degrees, which means that a direction of the target beam is the vertical direction; or the elevation angle is 90 degrees, which means that a direction of the target beam is a horizontal direction.

For example, in the case that the direction information of the target beam is used to indicate the azimuth angle of the target beam, the direction information of the target beam may further include measurement error information of the azimuth angle. In the case that the direction information of the target beam is used to indicate the elevation angle of the target beam, the direction information of the target beam may further include measurement error information of the elevation angle. In the case that the direction information of the target beam is used to indicate the beam width of the target beam, the direction information of the target beam may further include measurement error information of the beam width.

It should be noted that a measurement error indicated by any of the measurement error information may be a fixed error range, or an error range flexibly set based on an actual application scenario, or a pre-agreed or protocol-configured error granularity, which is not limited in this embodiment of the present invention.

Optionally, in this embodiment of the present invention, the first device has at least one of the following capabilities: a capability of obtaining direction information of the geographic north, a capability of recognizing a GCS direction, and a capability of calibrating the direction information.

Optionally, in this embodiment of the present invention, the energy change information of the target beam includes signal energy information of a signal measured through the target beam.

Optionally, in this embodiment of the present invention, in the case that the target beam is a transmit beam, the energy change information of the target beam includes signal energy information of a signal reported through the transmit beam of the first device.

Optionally, in this embodiment of the present invention, the energy change information of the target beam includes energy information of N beams, the N beams include the target beam, and N is a positive integer.

Optionally, in this embodiment of the present invention, the energy change information of the target beam may be a Gaussian function parameter, and the Gaussian function parameter is obtained based on the energy information of the N beams. For example, energy changes of the N beams may be a Gaussian-like distribution model with a particular probability. If the target beam is a beam corresponding to an LOS path, energy of the target beam may be a Gaussian-like distribution peak point or inflection point with a particular probability.

For example, the Gaussian function may be a T-variate Gaussian function, and T is at least any one of the following: 1, 2, and 3.

For example, the Gaussian function may be a one-mode or mixed Gaussian function. To be specific, the Gaussian function parameter may be T single-mode Gaussian function parameters, or mixed Gaussian function parameters. It should be noted that components of the mixed Gaussian function cannot exceed N.

For example, the Gaussian function parameter may be a mean value of the energy of the N beams, a variance of the energy of the N beams, or a mean square error of the energy of the N beams, which is not limited in this embodiment of the present invention.

Optionally, in this embodiment of the present invention, the energy change information of the target beam includes energy information of each of the N beams, or energy difference information between the N beams and the target beam.

For example, the energy difference information between the N beams and the target beam includes: energy difference information between the target beam and N−1 beams in the N beams other than the target beam, and energy difference information (that is, a difference is 0) between the target beams. Further, because the energy difference between the target beams is 0, the first device and the second device may determine, based on a positive or negative value of a difference between the N−1 beams in the N beams other than the target beam and the target beam, energy levels of the N beams and further determine an energy level trend of the N−1 beams in the N beams other than the target beam, thereby obtaining location information of the first device.

For example, differences between energy values of the N beams and an energy value of the target beam are separately calculated. If an energy difference between a beam and the target beam is negative, it indicates that energy of the beam is lower than energy of the target beam. If an energy difference between a beam and the target beam is positive, it indicates that energy of the beam is higher than energy of the target beam.

Optionally, in this embodiment of the present invention, the N beams include the target beam and N−1 spatially adjacent beams of the target beam.

Further, optionally, in the case that the first device reports the first information to the second device, the first device may further report, to the second device, indication information for indicating the spatially adjacent beams of the target beam.

Further, optionally, the energy difference information between the N beams and the target beam includes energy difference information between the energy of the target beam and the energy of the corresponding spatially adjacent beams.

Further, optionally, in the case that the target beam is a receive beam, the target beam may be a receive beam that QCL or TCI specified, or a strongest receive beam.

Further, optionally, in the case that the target beam is a receive beam, the target beam may be a beam corresponding to reporting information configured by a network-side device or a beam corresponding to a measurement result reported by the terminal device.

Optionally, in this embodiment of the present invention, the energy change information of the target beam includes energy information of M transmit beams received through a fixed target beam of the first device, where M is a positive integer.

For example, in the case that the target beam is a receive beam, the energy change information of the target beam may be signal energy information measured by receiving different transmit beams through a fixed receive beam of the first device. Alternatively, the energy change information of the target beam may be signal energy information measured through different receive beams of the first device.

Optionally, in this embodiment of the present invention, the LOS path indication information is determined based on the direction information of the target beam and/or the energy change information of the target beam.

For example, after measuring the direction information of the target beam and/or the energy change information of the target beam, the first device may determine whether the target beam is an LOS path, and then generate corresponding LOS path indication information based on whether the target beam is an LOS path. In this way, after the first device reports the LOS path indication information to the second device, the second device can obtain, based on the LOS path indication information, whether the target beam is an LOS path.

Optionally, in this embodiment of the present invention, the LOS path indication information may indicate, by using a bit 0 or a bit 1, whether the target beam is an LOS path.

Optionally, in this embodiment of the present invention, the LOS path indication information includes LOS quality information, and the LOS quality information is used to represent reliability or quality of an LOS path determining result of the target beam.

For example, in the case that the first device is a terminal device, if the terminal device has a particular capability of determining whether the target beam is an LOS path or a non-LOS path, the terminal device cannot make sure that its determining result is 100% correct. Therefore, the terminal device may report the LOS quality information to the second device, and after receiving the LOS quality information, the second device can perform positioning based on the LOS quality information when positioning a location of the first device.

For example, the LOS quality information may indicate reliability or quality of the LOS result determining by using X bit or bits.

For example, if the first information reported by the first device includes the LOS quality information, the peer second device may determine that the target beam is an LOS path, and if the first information reported by the first device lacks the LOS quality information, the peer second device may determine that the target beam is an NLOS path.

Optionally, in this embodiment of the present invention, the identification information of the target beam is identification information of a target signal, and the target signal is transmitted through the target beam.

Optionally, in this embodiment of the present invention, if the first information includes the direction information, the beam identification information is beam identification information corresponding to the direction information.

Optionally, in this embodiment of the present invention, if the first information includes the energy change information, the beam identification information is beam identification information corresponding to the energy change information.

For example, when the positioning method provided in this embodiment of the present invention is uplink positioning, the terminal device may report transmitting direction information together with corresponding transmit beam identification information.

Optionally, in this embodiment of the present invention, the identification information of the target beam includes at least one of the following: transmission and reception point (TRP) indication information, cell indication information, and measurement signal indication information.

For example, when the measurement signal is a PRS, the measurement signal indication information includes a downlink positioning reference signal resource set identifier DL-PRS resource set ID and a downlink positioning reference signal resource identifier DL-PRS resource ID. When the measurement signal is an SSB, the measurement signal indication information includes an SSB ID. When the measurement signal is a TRS, the measurement signal indication information includes TRS indication information. When the measurement signal is a CSI-RS, the measurement signal indication information includes CSI-RS indication information.

According to the positioning method provided in this embodiment of the present invention, after the second device obtains the first information from the first device, because the first information includes at least one of the following information of the target beam: the direction information, the energy change information, the LOS path indication information, and the beam identification information, the second device can accurately position a specific location of the target beam, and further can obtain the positioning information of the first device with higher accuracy, thereby improving communication efficiency and effectiveness.

Optionally, in this embodiment of the present invention, in the case that the first device is a terminal device, before step 201, the method further includes the following steps A1 and A2:

Step A1: The first device obtains measurement configuration information from the network-side device.

Step A2: The first device measures the first information based on the measurement configuration information.

The measurement configuration information is used to indicate the first information that the first device needs to measure.

For example, the first device may receive the measurement configuration information configured by the network-side device for the first device.

For example, the first device may select corresponding first information based on the measurement configuration information. That is, the information about the target beam included in the first information is associated with the measurement configuration information.

In an example, when the first device is a receive end, the measurement configuration information may include at least one of the following: indication information for indicating the target signal of the first device, request information for requesting the first device to measure the target signal, request information for requesting the first device to measure received energy of the target signal, request information for requesting the first device to measure receiving direction information of the target signal, and request information for requesting the first device to measure an LOS path of the target beam. For example, if the measurement configuration information includes the request information for requesting the first device to measure the target signal, the first device measures the target signal, that is, the first information includes measurement information of the target signal; or if the measurement configuration information includes the request information for requesting the first device to measure the received energy of the target signal, the first device measures the received energy of the target signal through the target beam, that is, the first information includes the energy change information of the target beam.

In an example, when the first device is a transmit end, the measurement configuration information may include at least one of the following: indication information for indicating the target signal of the first device, request information for requesting the first device to transmit the target signal, request information for requesting the first device to transmit transmitted energy of the target signal, request information for requesting the transmitting direction information of the target signal of the first device, and request information for requesting some or all beams sent by the first device.

Optionally, in this embodiment of the present invention, in the case that the first device is a terminal device, before step 201, the method further includes the following step B1:

Step B1: The first device obtains report configuration information from the network-side device.

The report configuration information is used to indicate the first information that the first device needs to report.

For example, the first device may obtain the report configuration information configured by the network-side device for the first device.

Further, in combination with the foregoing step B1, the foregoing step 201 may include the following step B2:

Step B2: The first device determines the first information based on the report configuration information.

For example, the first device may select, based on the report configuration information, first information needing to be reported. That is, the information about the target beam included in the first information is associated with the report configuration information.

In an example, when the first device is a receive end, the report configuration information may include at least one of the following: indication information for indicating the target signal of the first device, request information for requesting the first device to report a measurement result of the target signal, request information for requesting the first device to report received energy of the target signal, request information for requesting the first device to report receiving direction information of the target signal, and request information for requesting the first device to report an LOS path of the target beam.

In an example, when the first device is a transmit end, the report configuration information may include at least one of the following: indication information for indicating the target signal of the first device, request information for requesting the first device to report beam information related to transmitting of the target signal, request information for requesting the first device to report transmitted energy of the target signal, request information for requesting the first device to report transmitting direction information of the target signal, and request information for requesting the first device to report an LOS path of the target beam.

It should be noted that, that the first device determines the first information can be implemented through the measurement solution corresponding to the foregoing steps A1 and A2, or through the reporting solution corresponding to the foregoing steps B1 and B2, or through a combination of the measurement solution corresponding to the foregoing steps A1 and A2 and the reporting solution corresponding to the foregoing steps B1 and B2. This is not limited in this embodiment of the present invention.

Optionally, in this embodiment of the present invention, before the foregoing step 201, the method may further include the following steps:

Step C1: The second device configures first configuration information for the first device.

Step C2: The first device obtains the first configuration information from the second device.

The first configuration information includes first indication information for indicating the reference beam.

Further, the direction information of the target beam may be: an included angle between a direction of the target beam and a direction of the reference beam, or a difference between a beam ID corresponding to the direction of the target beam and a beam ID corresponding to the direction of the reference beam.

Further, optionally, in this embodiment of the present invention, the method further includes the following step:

Step C3: The second device configures third configuration information.

For example, the third configuration information is used to indicate content of the first information. For example, the third configuration information may be used to indicate an item, reported by the first device, of the direction information of the target beam, for example, the foregoing direction angle.

Optionally, in this embodiment of the present invention, before the foregoing step 201, the method may further include the following steps:

Step D1: The first device obtains second information.

Step D2: The second device obtains the second information.

The second information includes at least transmission angle information of the target signal.

For example, in the case that the second device is a server, the server may obtain transmission angle information of a target signal received or sent by a base station.

Optionally, in this embodiment of the present invention, before determining the first information, the first device may obtain transmission angle information of a signal of a third device, and then perform determining and selection with reference to transmission angle information of a beam of the first device and the transmission angle information of the signal of the third device. For example, in the case that the first device is a terminal device and the second device is a server, before determining the first information, the terminal device may obtain transmission angle information of a signal of the network-side device from the server, and in this case, the terminal device may ignore or reselect a receive beam with reference to angle information of a beam of the terminal device and the angle information of the network-side device and report the reselected beam to the server or the network-side device.

Figure 3:
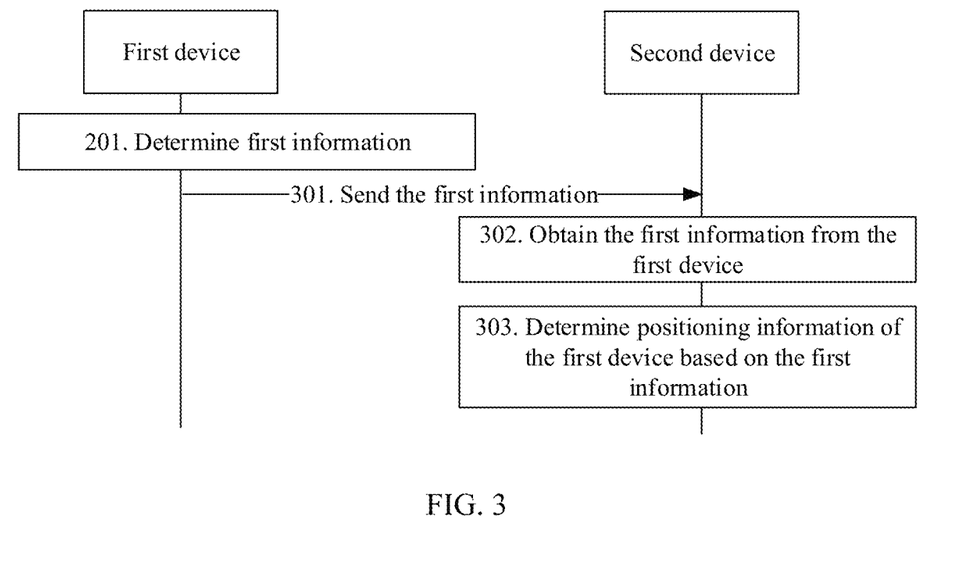
FIG. 3 is a schematic flowchart 2 of a positioning method according to an embodiment of the present invention.

Optionally, in this embodiment of the present invention, as shown in FIG. 3, after the foregoing step 201, the method may further include the following step 301:

Step 301: The first device sends the first information to the second device.

Further, the method may further include the following steps:

Step 302: The second device obtains the first information from the first device.

Step 303: The second device determines positioning information of the first device based on the first information.

For example, the second device may determine whether the target signal is an LOS path with reference to the first information and local information or related information uploaded by the network-side device. If the target signal is a non-LOS path, the second device may configure new QCL information or request the first device to report angle information of all or some beams. For example, a beam indicated by the new QCL information is a beam of an LOS path.

In an example, in the case that the first device is a terminal device and the second device is a positioning server, the third device is a network-side device. If the terminal device is a signal receiving or measurement device, the local information includes configuration information of a transmit signal of the network-side device stored on the positioning server, where the configuration information includes at least direction information or beam information, and the related information of the network-side device includes transmission direction information or beam information of a reported signal or the target beam of the network-side device.

Specifically, the second device may determine, based on the foregoing information, whether a receive beam of the target signal is an LOS beam, and if the receive beam is not an LOS beam, the second device may configure the first device to measure and report related signal measurement information of the LOS beam; or if the second device needs information for determining the LOS beam and its received signal, the second device may request the first device to report angle information of all or some beams or received signal information.

In another example, in the case that the first device is a terminal device and the second device is a positioning server, if the third device is a network-side device and the terminal device is a signal sending device, the local information includes configuration information of a receive beam of the network-side device stored in the positioning server, where the configuration information includes at least direction information or beam information, and the related information of the network-side device includes a signal or transmission direction information or beam information of the target beam reported by the network-side device.

Specifically, the second device may determine, based on the foregoing information, whether a receive beam of the target signal is an LOS beam, and if the receive beam is not an LOS beam, the second device may configure the network-side device to measure and report related signal measurement information of the LOS beam; or if the second device needs information for determining the LOS beam and its received signal, the second device may request the first device to report angle information of all or some beams or received signal information.

Further, optionally, in this embodiment of the present invention, the foregoing step 301 may further include the following step 301a or step 301b:

Step 301a: In the case that the first device is a terminal device and the second device is a network-side device, the first device reports the first information to the network-side device through RRC signaling.

Step 301b: In the case that the second device is a server, the first device reports the first information to the server through the LTE positioning protocol (LPP) or NRPP, or an evolved protocol.

For example, if the first information is provided by the terminal device to the server, the terminal device may report the first information through the LPP or NRPP, or its evolved protocol; or if the first information is provided by the terminal device to the base station, the terminal device may report the first information through RRC; or if the first information is provided by the base station to the server, the base station may report the first information through LPPa, or NRPPa, or its evolved protocol.

Optionally, in this embodiment of the present invention, if the first information lacks information about the target beam, the second device assumes that the information about the target beam is unchanged.

Optionally, in this embodiment of the present invention, the method may further include the following step 304:

Step 304: If the first information includes the information about the target beam, the second device determines whether the target signal is an LOS signal based on the information about the target beam.

For example, the information about the target beam includes at least one of the following: the direction information of the target beam, the energy change information of the target beam, the LOS path indication information, and the beam identification information.

For example, the information about the target beam may be azimuth angle information and/or elevation angle information and/or beam width information.

For example, the information about the target beam may be beam identification information, where the beam identification information may indicate the direction information of the target beam through a pre-agreed indication relationship.

For example, the information about the target beam may be direction information and beam identification information, and this example may be used to agree on a relationship between the beam identification information and the direction information. Alternatively, the beam identification information may be understood as reference signal identification information, to have an angle correspondence with a measurement signal or a transmit signal.

For example, the information about the target beam is energy change information of the target beam or energy change information of N−1 adjacent beams and the target beam.

For example, the information about the target beam is energy change information and beam identification information of the target beam, and this example may be used to agree on a relationship between the beam identification information and the energy information. Alternatively, the beam identification information may be understood as reference signal identification information, to have an energy correspondence with a measurement signal or a transmit signal.

For example, the information about the target beam is LOS path indication information.

For example, the beam identification information may be a unique identifier of a transmit beam and/or a receive beam, corresponding to a specific beam.

For example, in uplink positioning, the beam identification information may be indication information of an SRS signal or another uplink signal, such as an SRS resource ID and/or an SRS resource set ID.

For example, in downlink positioning, the beam identification information may be indication information of a PRS signal or another downlink signal, such as a PRS resource ID and/or a PRS resource set ID.

For example, during RTT positioning, beam information of both uplink and downlink positioning may be represented only by using an identifier of a downlink or uplink signal.

For example, if direction information of two adjacent receive beams does not change, the direction information of the receiving beam may be indicated only by beam identification information or default information; or if received energy change information of two adjacent receive beams does not change or does not exceed a change threshold, the information about the target beam may not be uploaded.

It should be noted that, in the embodiments of the present invention, the positioning method shown in each method drawing is illustratively described by using a drawing in the embodiments of the present invention as an example. During specific implementation, the positioning method shown in each method drawing may also be implemented in combination with any other drawings shown in the foregoing embodiments and details are not described herein again.

Figure 4:
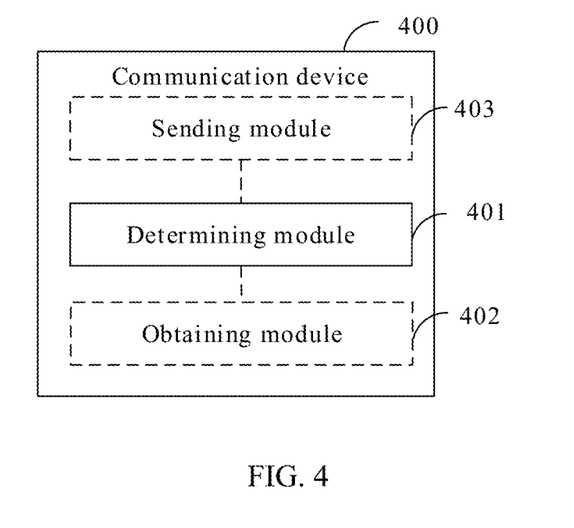
FIG. 4 is a schematic structural diagram 1 of a communication device according to an embodiment of the present invention.

As shown in FIG. 4, an embodiment of the present invention provides a communication device. The communication device is a first device, and the first device 400 includes a determining module 401. The determining module 401 is configured to determine first information, where the first information includes at least one of the following: direction information of a target beam, energy change information of the target beam, LOS path indication information, and beam identification information. The first information is used to determine positioning information of the first device. The LOS path indication information is used to indicate whether the target beam is an LOS path. The beam identification information is identification information of the target beam.

Optionally, the identification information of the target beam is identification information of a target signal, and the target signal is transmitted through the target beam.

Optionally, the first information further includes measurement information of the target signal, where the measurement information of the target signal includes at least one of the following: time information of an RTT, time information of a TOA, time information of a TDOA, information about an RSTD, and information about RSRP.

Optionally, if the first information includes the direction information, the beam identification information is beam identification information corresponding to the direction information.

Optionally, if the first information includes the energy change information, the beam identification information is beam identification information corresponding to the energy change information.

Optionally, the target beam is a measurement beam corresponding to a measurement result, reported by the first device, of the target signal. The measurement result is a measurement result obtained by the first device after measuring the target signal through the target beam, and the target signal is a downlink signal and includes at least one of the following: a DL-PRS, an SSB, a CSI-RS, and a TRS.

Optionally, the target beam is a corresponding beam through which the first device transmits the target signal. The target signal is an uplink reference signal and includes at least one of the following: an SRS and a DMRS.

Optionally, the first information is transmitted in location information or in signal measurement information.

Optionally, the direction information is used to indicate at least one of the following information of the target beam of the first device: an azimuth angle, an elevation angle, and a beam width.

Optionally, the azimuth angle is an included angle of the target beam relative to the geographic north; and/or the azimuth angle is direction information of an angle of the target beam relative to a reference beam; and/or the elevation angle is an included angle of the target beam relative to a vertical direction.

Optionally, the first device has at least one of the following capabilities: a capability of obtaining direction information of the geographic north, a capability of recognizing a GCS direction, and a capability of calibrating the direction information.

Optionally, the energy change information of the target beam includes energy information of N beams, the N beams include the target beam, and N is a positive integer.

Optionally, the energy change information of the target beam is a Gaussian function parameter, and the Gaussian function parameter is obtained based on the energy information of the N beams. The Gaussian function is a T-variate Gaussian function, and T is at least any one of the following: 1, 2, and 3.

Optionally, the energy change information of the target beam includes energy information of each of the N beams, or energy difference information between the N beams and the target beam.

Optionally, the N beams include the target beam and N−1 spatially adjacent beams of the target beam.

Optionally, the energy change information of the target beam includes energy information of M transmit beams received through a fixed target beam of the first device.

Optionally, the LOS path indication information is determined based on the direction information or the energy information.

Optionally, the LOS path indication information indicates, by using a bit 0 or a bit 1, whether the target beam is an LOS path.

Optionally, the LOS path indication information includes LOS quality information, and the LOS quality information is used to represent reliability or quality of an LOS path determining result of the target beam.

Optionally, as shown in FIG. 4, the first device further includes an obtaining module 402. The obtaining module 402 is configured to obtain measurement configuration information from a network-side device, and the determining module 401 is specifically configured to determine the first information based on the measurement configuration information received by the obtaining module 402; and/or the obtaining module 402 is further configured to obtain report configuration information from the network-side device, and the determining module 401 is specifically configured to determine the first information based on the report configuration information received by the obtaining module 402.

Optionally, the obtaining module 402 is further configured to obtain first configuration information from the network-side device. The first configuration information includes first indication information for indicating the reference beam.

Optionally, the obtaining module 402 is configured to obtain second information. The second information includes at least transmission angle information of the target signal.

Optionally, as shown in FIG. 4, the first device further includes a sending module 403. The sending module 403 is configured to report the first information determined by the determining module 401 to the second device.

Optionally, the sending module 403 is further configured to: in the case that the first device is a terminal device and the second device is a network-side device, report the first information to the network-side device through RRC signaling; or in the case that the second device is a server, report the first information to the server through the LPP or NRPP, or an evolved protocol.

According to the first device provided in this embodiment of the present invention, because the first information determined by the first device includes at least one of the following information of the target beam: the direction information, the energy change information, the LOS path indication information, and the beam identification information, the second device can accurately position a specific location of the target beam after the first device reports the first information to the second device, and further can obtain the positioning information of the first device with higher accuracy, thereby improving communication efficiency and effectiveness.

The first device provided in this embodiment of the present invention can implement any process shown in the foregoing method embodiment, and to avoid repetition, details are not described herein again.

It should be noted that, as shown in FIG. 4, a module that must be included in the first device 400 is indicated by a solid-line box, such as the determining module 401, and a module that may or may not be included in the first device 400 is indicated by a dashed-line box, such as the obtaining module 402.

Figure 5:
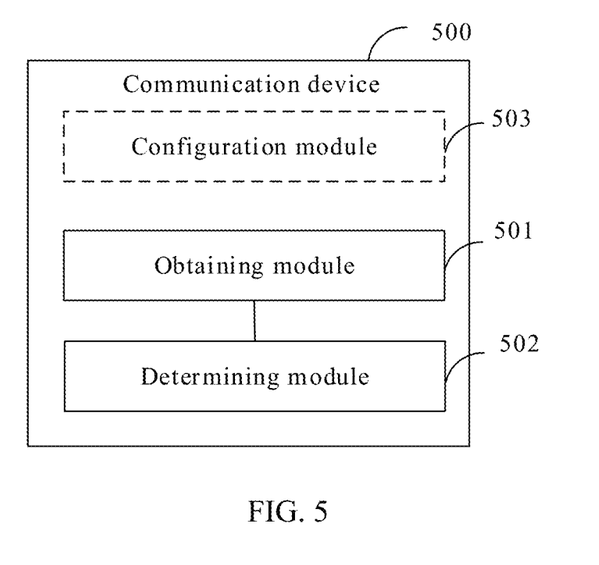
FIG. 5 is a schematic structural diagram 2 of a communication device according to an embodiment of the present invention.

As shown in FIG. 5, an embodiment of the present invention provides another communication device. The communication device is a second device, and the second device 500 includes an obtaining module 501 and a determining module 502. The obtaining module 501 is configured to obtain first information from a first device. The determining module 502 is configured to determine positioning information of the first device based on the first information obtained by the obtaining module 501. The first information includes at least one of the following: direction information of a target beam, energy change information of the target beam, line-of-sight LOS path indication information, and beam identification information. The LOS path indication information is used to indicate whether the target beam is an LOS path. The beam identification information is identification information of the target beam.

Optionally, the identification information of the target beam is identification information of a target signal, and the target signal is transmitted through the target beam.

Optionally, the first information further includes measurement information of the target signal, and the measurement information of the target signal includes at least one of the following: a DL-PRS, an SSB, a CSI-RS, and a TRS.

Optionally, in the case that the first information includes the direction information, the beam identification information is beam identification information corresponding to the direction information.

Optionally, in the case that the first information includes the energy change information, the beam identification information is beam identification information corresponding to the energy change information.

Optionally, if the first information lacks information about the target beam, the second device assumes that the information about the target beam is unchanged.

Optionally, the direction information is used to indicate at least one of the following information of the target beam of the first device: an azimuth angle, an elevation angle, and a beam width.

Optionally, the azimuth angle is an included angle of the target beam relative to the geographic north; and/or the azimuth angle is direction information of an angle of the target beam relative to a reference beam; and/or the elevation angle is an included angle of the target beam relative to a vertical direction.

Optionally, the energy change information of the target beam includes energy information of N beams, the N beams include the target beam, and N is a positive integer.

Optionally, the energy change information of the target beam is a Gaussian function parameter, and the Gaussian function parameter is obtained based on the energy information of the N beams. The Gaussian function is a T-variate Gaussian function, and T is at least any one of the following: 1, 2, and 3.

Optionally, the energy change information of the target beam includes energy information of each of the N beams, or energy difference information between the N beams and the target beam.

Optionally, the N beams include the target beam and N−1 spatially adjacent beams of the target beam.

Optionally, the energy change information of the target beam includes energy information of M transmit beams received through a fixed target beam of the first device.

Optionally, the LOS path indication information is determined based on the direction information or the energy change information.

Optionally, the LOS path indication information includes LOS quality information, and the LOS quality information is used to represent reliability or quality of an LOS path determining result of the target beam.

Optionally, the determining module 502 is further configured to: if the LOS path indication information includes LOS quality information, determine that the target beam is an LOS path, where the LOS quality information is used to represent reliability or quality of an LOS path determining result of the target beam; or if the LOS path indication information lacks the LOS quality information, determine that the target beam is an NLOS path.

Optionally, as shown in FIG. 5, the second device further includes a configuration module 503. The configuration module 503 is configured to configure first configuration information for the first device. The first configuration information includes first indication information for indicating the reference beam.

Optionally, the obtaining module 501 is further configured to obtain second information. The second information includes at least transmission angle information of the target signal.

According to the second device provided in this embodiment of the present invention, after the second device obtains the first information from the first device, because the first information includes at least one of the following information of the target beam: the direction information, the energy change information, the LOS path indication information, and the beam identification information, the second device can accurately position a specific location of the target beam, and further can obtain the positioning information of the first device with higher accuracy, thereby improving communication efficiency and effectiveness.

It should be noted that, as shown in FIG. 5, a module that must be included in the second device 500 is indicated by a solid-line box, such as the determining module 502, and a module that may or may not be included in the second device 500 is indicated by a dashed-line box, such as the configuration module 503.

The second device provided in this embodiment of the present invention can implement any process shown in the foregoing method embodiment, and to avoid repetition, details are not described herein again.

Figure 6:
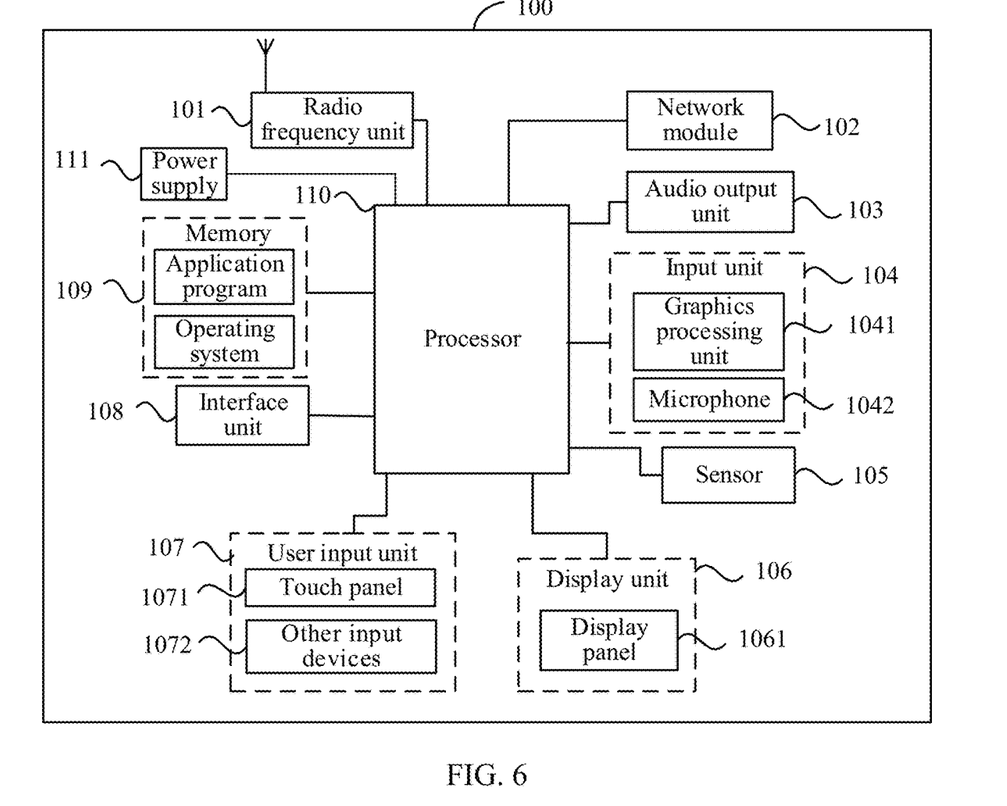
FIG. 6 is a schematic structural diagram of hardware of a terminal device according to an embodiment of the present invention.

A terminal device is used as an example of the first device. FIG. 6 is a schematic diagram of a hardware structure of a terminal device for implementing embodiments of the present invention. The terminal device 100 includes, but is not limited to, a radio frequency unit 101, a network module 102, an audio output unit 103, an input unit 104, a sensor 105, a display unit 106, a user input unit 107, an interface unit 108, a memory 109, a processor 110, a power supply 111, and the like. A person skilled in the art may understand that the structure of the terminal device 100 shown in FIG. 6 does not constitute a limitation on the terminal device. The terminal device 100 may include more or fewer components than those shown in the figure, or combine some components, or have a different component arrangement. In this embodiment of the present invention, the terminal device 100 includes, but is not limited to, a mobile phone, a tablet computer, a notebook computer, a palmtop computer, a vehicle-mounted terminal device, a wearable device, a pedometer, and the like.

The processor 110 is configured to determine first information, where the first information includes at least one of the following: direction information of a target beam, energy change information of the target beam, LOS path indication information, and beam identification information. The first information is used to determine positioning information of the first device. The LOS path indication information is used to indicate whether the target beam is an LOS path. The beam identification information is identification information of the target beam.

According to the terminal device provided in this embodiment of the present invention, because the first information determined by the terminal device includes at least one of the following information of the target beam: the direction information, the energy change information, the LOS path indication information, and the beam identification information, the second device can accurately position a specific location of the target beam after the terminal device reports the first information to the second device, and further can obtain the positioning information of the terminal device with higher accuracy, thereby improving communication efficiency and effectiveness.

It should be understood that in this embodiment of the present invention, the radio frequency unit 101 may be configured to receive and transmit signals in an information reception or transmission or call process. Specifically, after receiving downlink data from a base station, the radio frequency unit 101 transmits the downlink data to the processor 110 for processing, and in addition, transmits uplink data to the base station. Generally, the radio frequency unit 101 includes but is not limited to an antenna, at least one amplifier, a transceiver, a coupler, a low noise amplifier, a duplexer, and the like. In addition, the radio frequency unit 101 may further communicate with a network and another device through a wireless communications system.

The terminal device 100 provides wireless broadband internet access for a user by using the network module 102, for example, helps the user send and receive emails, browse web pages, and access streaming media.

The audio output unit 103 may convert audio data received by the radio frequency unit 101 or the network module 102 or stored in the memory 109 into an audio signal and output the audio signal as a sound. In addition, the audio output unit 103 may further provide audio output (for example, a call signal received sound or a message received sound) related to a specific function performed by the terminal device 100. The audio output unit 103 includes a speaker, a buzzer, a telephone receiver, and the like.

The input unit 104 is configured to receive an audio or video signal. The input unit 104 may include a graphics processing unit (GPU) 1041 and a microphone 1042, and the graphics processing unit 1041 processes image data of a still picture or a video obtained by an image capture apparatus (for example, a camera) in an image capture mode or a video capture mode. A processed image frame may be displayed on the display unit 106. An image frame processed by the graphics processing unit 1041 may be stored in the memory 109 (or another storage medium) or sent by the radio frequency unit 101 or the network module 102. The microphone 1042 can receive a sound and can process the sound into audio data. The processed audio data can be converted, for outputting, into a format that can be sent to a mobile communication base station through the radio frequency unit 101 in a telephone call mode.

The terminal device 100 further includes at least one sensor 105, for example, an optical sensor, a motion sensor, and other sensors. Specifically, the optical sensor includes an ambient light sensor and a proximity sensor. The ambient light sensor may adjust brightness of a display panel 1061 based on intensity of ambient light. When the terminal device 100 moves near an ear, the proximity sensor may disable the display panel 1061 and/or backlight. As a type of motion sensor, an accelerometer sensor can detect magnitudes of accelerations in all directions (usually three axes), can detect the magnitude and direction of gravity when the mobile phone is in a static state, and can be applied to terminal device posture recognition (such as screen switching between portrait and landscape, related games, and magnetometer posture calibration), functions related to vibration recognition (such as pedometer and tapping), and the like. The sensor 105 may further include a fingerprint sensor, a pressure sensor, an iris sensor, a molecular sensor, a gyroscope, a barometer, a hygrometer, a thermometer, an infrared sensor, and the like. Details are not described herein.

The display unit 106 is configured to display information input by the user or information provided for the user. The display unit 106 may include the display panel 1061. The display panel 1061 may be configured in a form of a liquid crystal display (LCD), an organic light-emitting diode (OLED), or the like.

The user input unit 107 may be configured to receive entered numerical or character information, and generate key signal input that is related to user setting and function control of the terminal device 100. Specifically, the user input unit 107 includes a touch panel 1071 and other input devices 1072. The touch panel 1071, also referred to as a touchscreen, may capture a touch operation performed by a user on or near the touch panel (for example, an operation performed by the user on the touch panel 1071 or near the touch panel 1071 by using any appropriate object or accessory such as a finger or a stylus). The touch panel 1071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information to point coordinates, and sends the point coordinates to the processor 110, and receives and executes a command sent by the processor 110. In addition, the touch panel 1071 may be implemented in a plurality of forms, for example, as a resistive, capacitive, infrared, or surface acoustic wave touch panel. The user input unit 107 may further include other input devices 1072 in addition to the touch panel 1071. Specifically, the other input devices 1072 may include but are not limited to a physical keyboard, a function key (such as a volume control key or a power on/off key), a trackball, a mouse, a joystick, and the like. Details are not described herein.

Further, the touch panel 1071 may cover the display panel 1061. After detecting a touch operation on or near the touch panel 1071, the touch panel 1071 transmits the touch operation to the processor 110 to determine a type of a touch event. Then the processor 110 provides corresponding visual output on the display panel 1061 based on the type of the touch event. Although the touch panel 1071 and the display panel 1061 serve as two independent components to implement input and output functions of the terminal device 100 in FIG. 6, in some embodiments, the touch panel 1071 and the display panel 1061 may be integrated to implement the input and output functions of the terminal device 100. This is not specifically limited herein.

The interface unit 108 is an interface for connecting an external apparatus to the terminal device 100. For example, the external apparatus may include a wired or wireless headphone port, an external power supply (or battery charger) port, a wired or wireless data port, a memory card port, a port for connecting an apparatus with an identification module, an audio input/output (I/O) port, a video I/O port, a headset port, or the like. The interface unit 108 may be configured to receive an input (for example, data information or power) from an external apparatus and transmit the received input to one or more elements within the terminal device 100, or may be configured to transmit data between the terminal device 100 and the external apparatus.

The memory 109 may be configured to store a software program and various data. The memory 109 may mainly include a program storage area and a data storage area. The program storage area may store an operating system, an application program required for at least one function (such as a sound play function and an image play function), and the like. The data storage area may store data (such as audio data and a phone book) created based on use of a mobile phone, and the like. In addition, the memory 109 may include a high-speed random access memory, or may include a non-volatile memory, for example, at least one magnetic disk storage device, a flash memory device, or other volatile solid-state storage devices.

The processor 110 is a control center of the terminal device 100, uses various interfaces and lines to connect all parts of the entire terminal device 100, and performs various functions and data processing of the terminal device 100 by running or executing the software program and/or module stored in the memory 109 and invoking data stored in the memory 109, thereby performing overall monitoring on the terminal device 100. The processor 110 may include one or more processing units. Optionally, the processor 110 may integrate an application processor and a modem processor. The application processor mainly processes an operating system, a user interface, an application program, and the like. The modem processor mainly processes wireless communication. It may be understood that the modem processor may alternatively not be integrated into the processor 110.

The terminal device 100 may further include a power supply 111 (for example, a battery) that supplies power to the components. Optionally, the power supply 111 may be logically connected to the processor 110 by using a power management system, so as to implement functions such as charging management, discharging management, and power consumption management by using the power management system.

In addition, the terminal device 100 includes some function modules that are not shown. Details are not described herein.

An embodiment of the present invention further provides a first device, including a processor, a memory, and a computer program stored in the memory and capable of running on the processor. When the computer program is executed by the processor, the process of the positioning method in the foregoing embodiment is implemented, and a same technical effect can be achieved. To avoid repetition, details are not described herein again.

Optionally, an embodiment of the present invention further provides a terminal device, including a processor, a memory, and a computer program stored in the memory and capable of running on the processor. When the computer program is executed by the processor, the process of the positioning method in the foregoing embodiment is implemented, and a same technical effect can be achieved. To avoid repetition, details are not described herein again.

Figure 7:
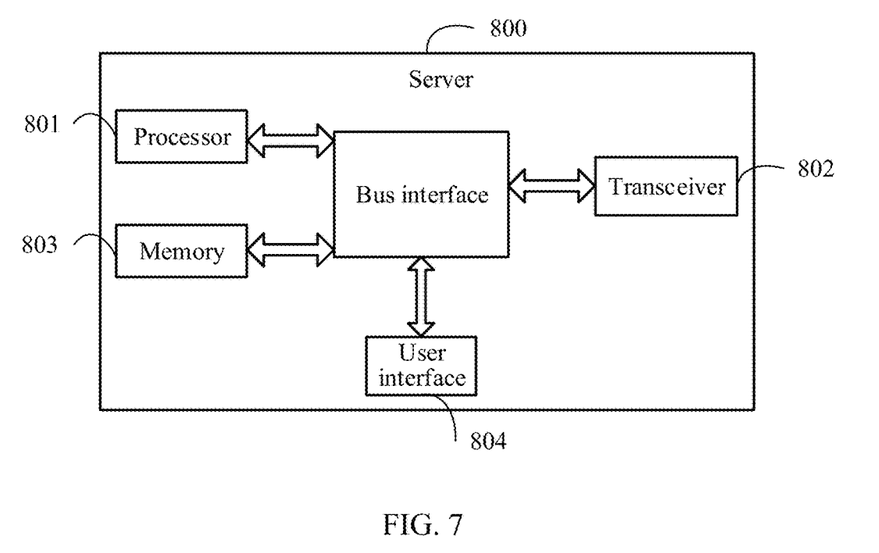
FIG. 7 is a schematic structural diagram of hardware of a server according to an embodiment of the present invention.

A server is used as an example of the second device. FIG. 7 is a schematic diagram of a hardware structure of a server for implementing embodiments of the present invention. The server 800 includes a processor 801, a transceiver 802, a memory 803, a user interface 804, and a bus interface.

The transceiver 802 is configured to obtain first information from a first device. The processor 801 is configured to determine positioning information of the first device based on the first information obtained by the obtaining module, where the first information includes at least one of the following: direction information of a target beam, energy change information of the target beam, LOS path indication information, and beam identification information. The LOS path indication information is used to indicate whether the target beam is an LOS path. The beam identification information is identification information of the target beam.

According to the server provided in this embodiment of the present invention, after the server obtains the first information from the first device, because the first information includes at least one of the following information of the target beam: the direction information, the energy change information, the LOS path indication information, and the beam identification information, the server can accurately position a specific location of the target beam, and further can obtain the positioning information of the first device with higher accuracy, thereby improving communication efficiency and effectiveness.

In this embodiment of the present invention, in FIG. 7, the bus architecture may include any quantity of interconnected buses and bridges. Specifically, one or more processors represented by the processor 801 and a memory represented by the memory 803 are linked together through various circuits. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, including a transmitter and a receiver, and provides units for communicating with a variety of other apparatuses on a transmission medium. For different user equipment, the user interface 804 may also be an interface capable of externally or internally connecting a required device, and the connected device includes but is not limited to a keypad, a display, a speaker, a microphone, a joystick, and the like. The processor 801 is responsible for management of the bus architecture and general processing, and the memory 803 may store data for use by the processor 801 when the processor 801 performs an operation.

In addition, the server 800 further includes some function modules that are not shown. Details are not described herein.

An embodiment of the present invention further provides a second device, including a processor, a memory, and a computer program stored in the memory and capable of running on the processor. When the computer program is executed by the processor, the process of the positioning method in the foregoing embodiment is implemented, and a same technical effect can be achieved. To avoid repetition, details are not described herein again.

Optionally, an embodiment of the present invention further provides a server, including a processor, a memory, and a computer program stored in the memory and capable of running on the processor. When the computer program is executed by the processor, the process of the positioning method in the foregoing embodiment is implemented, and a same technical effect can be achieved. To avoid repetition, details are not described herein again.

An embodiment of the present invention further provides a computer-readable storage medium, where the computer-readable storage medium stores a computer program. When the computer program is executed by a processor, a plurality of processes of the positioning method in the foregoing embodiment are implemented, and a same technical effect can be achieved. To avoid repetition, details are not described herein again. The foregoing computer-readable storage medium includes a read-only memory (ROM for short), a random access memory (RAM for short), a magnetic disk, an optical disc, or the like.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude the existence of other identical elements in the process, method, article, or apparatus that includes the element.

According to the description of the foregoing implementations, persons skilled in the art can clearly understand that the method in the foregoing embodiments may be implemented by software in addition to a necessary universal hardware platform or by hardware only. In most cases, the former is a more preferred implementation. Based on such an understanding, the technical solutions of the present invention essentially, or the part contributing to the conventional technology may be implemented in the form of a software product. The software product is stored in a storage medium (such as a ROM/RAM, a magnetic disk, or an optical disc) and includes a plurality of instructions for enabling a terminal device (which may be a mobile phone, a personal computer, a server, an air conditioner, a network-side device, or the like) to perform the methods described in the plurality of embodiments of the present invention.

The embodiments of the present invention are described above with reference to the accompanying drawings, but this application is not limited to the foregoing specific embodiments, which are merely illustrative rather than restrictive. Under the inspiration of the present invention, many forms can be made by a person of ordinary skill in the art, without departing from the principle of this application and the protection scope of claims, and shall all fall within the protection scope of this application.

What is claimed is:

1. A positioning method, performed by a terminal device, wherein the method comprises:
   determining first information, wherein
   the first information comprises line-of-sight (LOS) path indication information;
   the first information is used to determine positioning information of the terminal device;
   the LOS path indication information is used to indicate whether a target beam is an LOS path; and
   the LOS path indication information comprises LOS quality information, and the LOS quality information is used to represent reliability or quality of an LOS path determining result of the target beam.

2. The method according to claim 1, wherein the first information further comprises at least one of the following: direction information of the target beam, energy change information of the target beam, and beam identification information;
   wherein the beam identification information is identification information of the target beam.

3. The method according to claim 1, wherein the first information further comprises measurement information of the target signal; and
   the measurement information of the target signal comprises at least one of the following: time information of a round-trip time (RTT), time information of a time of arrival (TOA), time information of a time difference of arrival (TDOA), information about a reference signal time difference (RSTD), and information about reference signal received power (RSRP).

4. The method according to claim 2, wherein if the first information comprises the energy change information, the beam identification information is beam identification information corresponding to the energy change information.

5. The method according to claim 1, wherein the target beam is a measurement beam corresponding to a measurement result, reported by the terminal device, of the target signal; and
   the measurement result is a measurement result obtained by the terminal device after measuring the target signal through the target beam, and the target signal is a downlink signal and comprises at least one of the following: a downlink positioning reference signal (DL-PRS), a synchronization signal/PBCH block (SSB), a channel state information reference signal (CSI-RS), and a tracking reference signal (TRS).

6. The method according to claim 1, wherein the first information is transmitted in location information or signal measurement information.

7. The method according to claim 1, wherein the direction information is used to indicate at least one of the following information of the target beam of the terminal device: an azimuth angle, an elevation angle, and a beam width.

8. The method according to claim 2, wherein the energy change information of the target beam comprises energy information of N beams, the N beams comprise the target beam, and N is a positive integer.

9. The method according to claim 8, wherein the energy change information of the target beam comprises energy information of each of the N beams, or energy difference information between the N beams and the target beam.

10. The method according to claim 8, wherein the N beams comprise the target beam and N−1 spatially adjacent beams of the target beam.

11. The method according to claim 1, wherein the energy change information of the target beam comprises energy information of M transmit beams received through a fixed target beam of the terminal device.

12. The method according to claim 1, wherein the identification information of the target beam is identification information of a target signal, and the target signal is transmitted through the target beam.

13. The method according to claim 1, wherein before the determining first information, the method further comprises:
    obtaining measurement configuration information from a network-side device; and
    determining the first information based on the measurement configuration information; and/or
    before the determining first information, the method further comprises:
    obtaining report configuration information from a network-side device; and
    the determining first information comprises:
    determining the first information based on the report configuration information.

14. The method according to claim 1, wherein before the determining first information, the method further comprises:
    obtaining second information, wherein the second information at least comprises transmission angle information of a target signal.

15. The method according to claim 1, wherein after the determining first information, the method further comprises:
    sending the first information to a network-side device or a server.

16. A communication device, wherein the communication device is a terminal device, comprising a processor, a memory, and a computer program stored in the memory and capable of running on the processor, and the computer program, when being executed by the processor, causes the processor to implement a step of:
    determining first information, wherein the first information comprises line-of-sight (LOS) path indication information;
    the first information is used to determine positioning information of the terminal device;
    the LOS path indication information is used to indicate whether a target beam is an LOS path; and
    the LOS path indication information comprises LOS quality information, and the LOS quality information is used to represent reliability or quality of an LOS path determining result of the target beam.

17. The communication device according to claim 16, wherein the first information further comprises at least one of the following: direction information of the target beam, energy change information of the target beam, and beam identification information;

wherein the beam identification information is identification information of the target beam;

wherein the identification information of the target beam is identification information of a target signal, and the target signal is transmitted through the target beam.

18. The communication device according to claim 16, wherein the first information further comprises measurement information of the target signal; and the measurement information of the target signal comprises at least one of the following: time information of a round-trip time (RTT), time information of a time of arrival (TOA), time information of a time difference of arrival (TDOA), information about a reference signal time difference (RSTD), and information about reference signal received power (RSRP).

19. The communication device according to claim 16, wherein the target beam is a measurement beam corresponding to a measurement result, reported by the terminal device, of the target signal; and the measurement result is a measurement result obtained by the terminal device after measuring the target signal through the target beam, and the target signal is a downlink signal and comprises at least one of the following: a downlink positioning reference signal (DL-PRS), a synchronization signal/PBCH block (SSB), a channel state information reference signal (CSI-RS), and a tracking reference signal (TRS).

20. A communication device, wherein the communication device is a network-side device or a server, comprising a processor, a memory, and a computer program stored in the memory and capable of running on the processor, and the computer program, when being executed by the processor, causes the processor to implement steps of:

obtaining first information from a terminal device; and determining positioning information of the terminal device based on the first information, wherein the first information comprises line-of-sight (LOS) path indication information;

the first information is used to determine positioning information of the terminal device;

the LOS path indication information is used to indicate whether a target beam is an LOS path; and the LOS path indication information comprises LOS quality information, and the LOS quality information is used to represent reliability or quality of an LOS path determining result of the target beam.

\* \* \* \* \*